United States Patent [19]

Strauss

[11] Patent Number: 5,401,404
[45] Date of Patent: Mar. 28, 1995

[54] STACKED DISK COALESCER

[76] Inventor: Richard Strauss, Keller Products, Inc., Box 26, Lexington, Mass. 02173

[21] Appl. No.: 6,529

[22] Filed: Jan. 21, 1993

[51] Int. Cl.$^6$ .............. B01D 29/00; B01D 35/00; B01D 15/00; C02F 1/40
[52] U.S. Cl. .................... 210/265; 210/94; 210/252; 210/257.1; 210/258; 210/486; 210/498; 210/513; 210/521; 210/DIG. 5; 210/680; 210/799; 210/804; 210/806
[58] Field of Search .............. 210/252, 257.1, 258, 210/260, 265, 94, 264, 346, 486, 498, 513, 521, DIG. 5, 767, 799, 804, 806, 680, 694

[56] References Cited

U.S. PATENT DOCUMENTS

| | | | |
|---|---|---|---|
| 1,513,882 | 11/1924 | Bateman | 210/94 |
| 2,588,794 | 3/1952 | Barton | 210/799 |
| 3,214,368 | 10/1965 | Muller | 210/DIG. 5 |
| 3,229,817 | 1/1966 | Pall | 210/DIG. 5 |
| 3,450,632 | 6/1969 | Olson et al. | 210/799 |
| 3,563,389 | 2/1971 | Mizrahi | 210/521 |
| 3,800,945 | 4/1974 | Fowler | 210/489 |
| 4,248,705 | 2/1981 | Vadekar | 210/680 |
| 4,315,822 | 2/1982 | Jaisinghani | 210/258 |
| 4,385,986 | 5/1983 | Jaisinghani | 210/123 |
| 4,592,839 | 6/1986 | Rosenberg | 210/352 |
| 4,643,834 | 2/1987 | Batutis | 210/740 |
| 4,802,978 | 2/1989 | Schmit et al. | 210/104 |
| 4,859,329 | 8/1989 | Fink | 210/257.1 |
| 4,880,537 | 11/1989 | Drori | 210/523.1 |
| 5,098,565 | 3/1992 | Drori | 210/346 |
| 5,207,895 | 5/1993 | Basseen et al. | 210/DIG. 5 |

*Primary Examiner*—Sun Uk Kim
*Attorney, Agent, or Firm*—Ellen C. Childress

[57] ABSTRACT

A method and materials for separating oil from water, using stacked disks to coalesce the oil, is disclosed. The method of coalescence allows configuration of systems which are compact, efficient, adaptable to modular configuration, and have a very high flow rate.

7 Claims, 4 Drawing Sheets

5,401,404

STACKED DISK COALESCER

FIELD OF THE INVENTION

This invention pertains liquid purification and separation.

BACKGROUND OF THE INVENTION

Separation of immiscible phases, oil and water in particular, has many uses. Such separation can be used in collection of desirable oils, and cleaning of waste water. Early methods included letting the phases separate by gravity and/or cooling until solidification occurred then removing the solids. However, solidification is not practical for light oils, and phase separation based only on gravity takes time. A problem with phase separation occurs when the oil forms very small droplets which tend to disperse throughout the aqueous phase. Overcoming surface tension to get small droplets to merge is coalescing. Larger droplets coalesce better than small droplets making separation of the phases then possible. However, getting the fine droplets to coalesce has been difficult and time consuming.

U.S. Pat. No. 4,802,978 discloses an inclined plate separator of a kind commonly used to coalesce and separate oil droplets dispersed in an aqueous liquid. This separator uses a series of corrugated oleophilic plates arranged in a cylindrical tank to one side of a diffusion baffle. The plates are inclined upward to take advantage of gravity. However, for some systems, a secondary separator, which uses oleophilic filtering material, is necessary because the inclined plate separator alone cannot completely coalesce and separate the oil droplets.

U.S. Pat. No. 4,385,986 discloses a gravity separator also having slanted separator plates for separating bilge water.

U.S. Pat. No. 4,859,329 describes a system for separating oils from waste wash water in which "Mechanically emulsified oil products are coalesced using a matrix of polypropylene baffles". Such baffles are described as effective in coalescing globules down to 20 microns. However, a disadvantage of polypropylene attraction noted by the patent is that it will not remove light or emulsified oil and will not work in heavy flows.

U.S. Pat. No. 4,643,834 discloses a multiple stage coalescer having inclined V shaped plates with progressively finer clearances between plates from stage to stage. The patent states "Where turbulence is avoided, flocculations and coalescence—and hence separation—all take place more efficiently."

U.S. Pat. No. 3,800,945 discloses a cell claiming catalytic action for coalescing oil droplets. Catalytic agents are impregnated into emulsion breaking fibrous material which is wound around a core.

U.S. Pat. No. 3,563,389 discloses a gravitational settler adapted for separation of liquid-liquid dispersions. A series of sloping plates are used to increase the rate of coalescence of droplets. Suitable distance between the plates is suggested to be 5 to 60 mm, preferably 10 to 40 mm.

Disk filters are well known for high flow rate filtration of particulates from liquids, particularly water used in drip irrigation systems. However, the inventor is unaware of the use of such filter disks as components in oil/water separation systems.

U.S. Pat. No. 5,098,565, incorporated herein by reference, discloses a stacked disk-type filter designed to fit in a standardized housing. The disks have fingers which permit particulate matter to become disengaged.

U.S. Pat. No. 4,880,537, incorporated herein by reference, discloses a stacked disk type filters having a variety of spacing arrangements, for example, defining grooves on a first surface and accumulator grooves on a second surface.

U.S. Pat. No. 4,592,839, incorporated herein by reference, discloses a multiple disc filter for removal of particulate matter from water. Such disk filters are commonly used in drip irrigation systems.

Inclined plate separators and other types of existing coalescer-separator systems available till the present invention have the following disadvantages: low throughput to avoid turbulence, long residence time and therefore large holdup volume, and relatively low separation efficiency for small droplet dispersions.

SUMMARY OF THE INVENTION

To overcome such deficiencies, while providing additional advantages, a new type of coalescer-separator incorporates at least two operating stages: 1) a coalescer stage comprising a stack of tightly packed polyolefin disks, with sized flow passages on the surface of each disk; and 2) a gravity separation stage to remove bulk oil and/or large oil droplets formed in the coalescer stage. When a mixture of oil and water is passes through the disk element, oil preferentially wets the oleophilic disk surfaces, coalesces and is then forced by the flow of liquid to exit the first stage as slugs of oil, which are easily removed in the second stage.

Compared to inclined plate separators and other types of gravity separators, the two stage separator of this invention has a much higher flow rate per unit volume of separator, and coalesces and separates small droplet dispersions at much higher efficiency. In addition, this separation system is an efficient and convenient filter for solids often present in oil/water mixtures. With inclined plate separators, solids build up on the bottom of the separator tank and must be manually scooped or washed periodically, a costly and inconvenient procedure.

DESCRIPTION OF THE PREFERRED EMBODIMENTS

Figure 1:
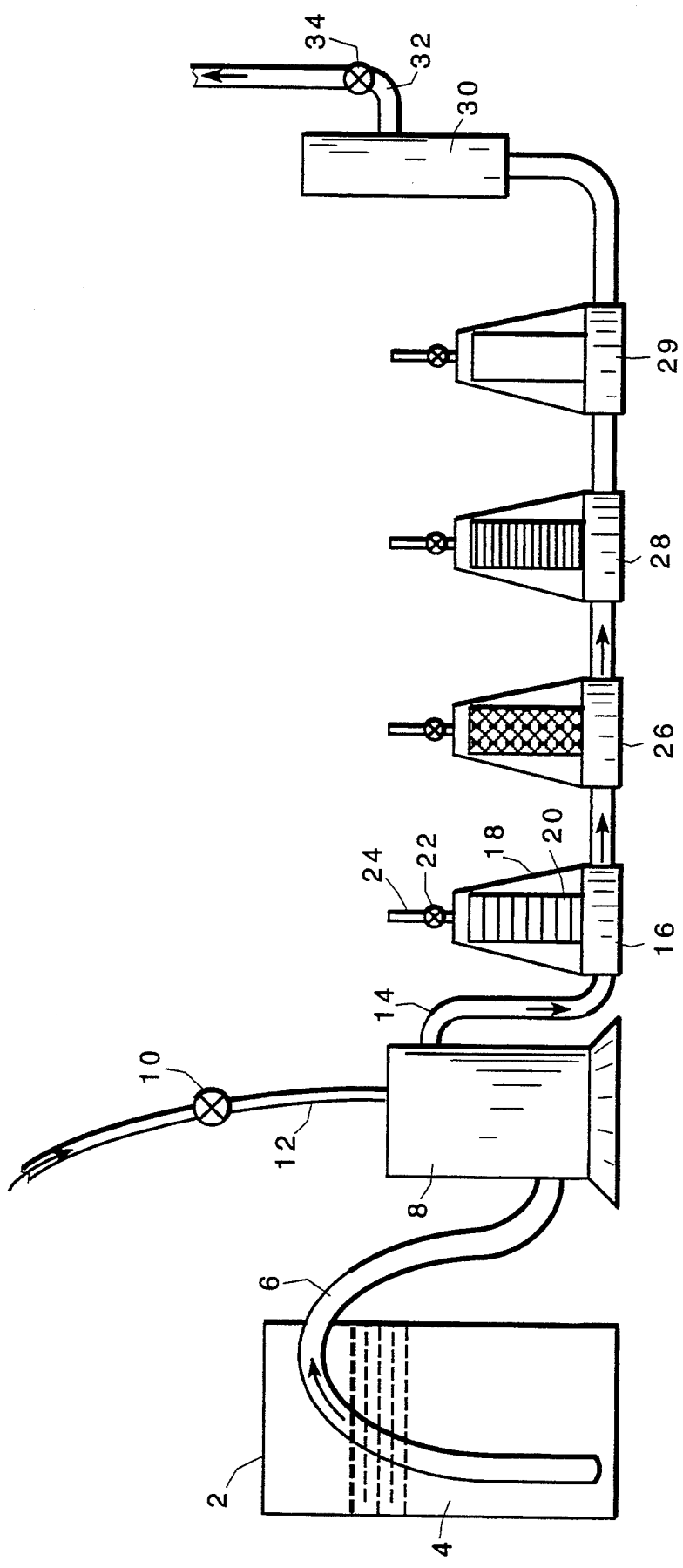
FIG. 1 is a schematic diagram of a system for separation of an oil-water mixture.

FIG. 1 shows a system for removing oil from waste water 4, such as compressed air system condensate, which has been stored in a barrel 2. Upon turning a valve 10 for a compressed air line 12, a pump 8 begins operation, drawing waste water 4 from the barrel 2 through a hose 6. The water then passes through line 14 into a stacked disk coalescer The water is forced through a stack of polyolefin disks 20 which cause small droplets to coalesce. The water then passes into a separator 26. Coalesced oil is forced by the flow of water through the connecting tube as slugs of oil. The coalesced oil is the easily separated from the water by gravity in the second separation stage and is removed from the system through a valve and pipe or tube at the top of the second stage. It has been found that a convenient device for second stage separation, after oil is coalesced in the first stage, is a stacked disk element with flow passages of a finer mesh than those in the first stage coalescer. However, any conventional phase separator such as an inclined plate separator, mesh separator or water wetable screen may be used as the second stage separation following coalescing of oil by the first stage disk coalescer. After separation, cleaned water may flow through polishing filtration stages to remove trace quantities of suspended oil or solids such as a stacked disk filter 28 and activated carbon filter 29. Such polishing steps are optional. Water then passes through a rotameter 30 out exit pipe 32 controlled by valve 34.

The stacked disk coalescer and separator can be housed in clear housings 18, so that as oil accumulates at the top, it can easily be seen and drawn off through valve 22 out line 24. Stacked disks are made of an oleophilic material such as polyolefin and are structurally similar to those used for filtering particulate material. For efficient coalescing, flow passages defined by the disks must fall in a limited size range, from about 40 mesh (400 micron) to about 155 mesh (100 micron). Coarser filers will permit a large fraction of oil droplets to pass through without coalescing, and finer filters will permit coalesced oil to be forced downstream in relatively small drop sizes which are difficult to separate. A preferred filtration rating for the coalescer cartridge of stacked disk coalescer 16 is 60 to 100 mesh. The stacked disk cartridge coalesces oil droplets by causing small droplets to coat the surfaces of the oil wettable discs until the flow passages are completely filled with oil. The flow of feed liquid then forces large oil drops or slugs downstream.

When compared to a common type of commercial coalescer which uses inclined parallel plates spaced apart by 0.25 inches or more, the disc coalescer is more efficient for small droplets, has a much higher surface area per unit of volume and can be easily configured in a pressure system. The high surface area allows for a very compact design. Use in a pressure system allows that multiple treatment stages can easily be added as modules. The substantially different structure of stacked filter disks from inclined plates results in superior coalescing efficiency and flow rate per unit area.

One system of the above configuration capable of removing oil at 1 gal per min and discharging cleaned water with a suspended oil content of less than 40 parts per million, can be fit on a three foot cart and weighs only 50 pounds, much smaller and more efficient that a standard inclined plate separator.

Disk elements used for oil separation, unlike those used for particulate separation, need little or no maintenance. There is no need for back flushing, since their pressure drop and coalescing efficiency are unchanged when they are wet with oil. In the configuration of FIG. 1, the only part requiring replacement is the carbon filter. The secondary coalescer and carbon filter provide insurance that even if the separator is left unattended, that there will not be carryover into treated water. Efficiency of separation is not dependent on oil content. It has been successfully used on water having from trace oil to 30%.

The secondary oil coalescer 28 can be of a finer rating, 155 mesh (100 microns), to trap any oil droplets which may have carried over from the collector This system can be used for removing oil from waste water, compressed air line condensate, tank washdown water and oil contaminated groundwater. It may also find commercial applications separating oils for industrial purposes, for example the production of cooking oils, or removal of volatile oils from coffee prior to freeze-drying.

Figure 2:
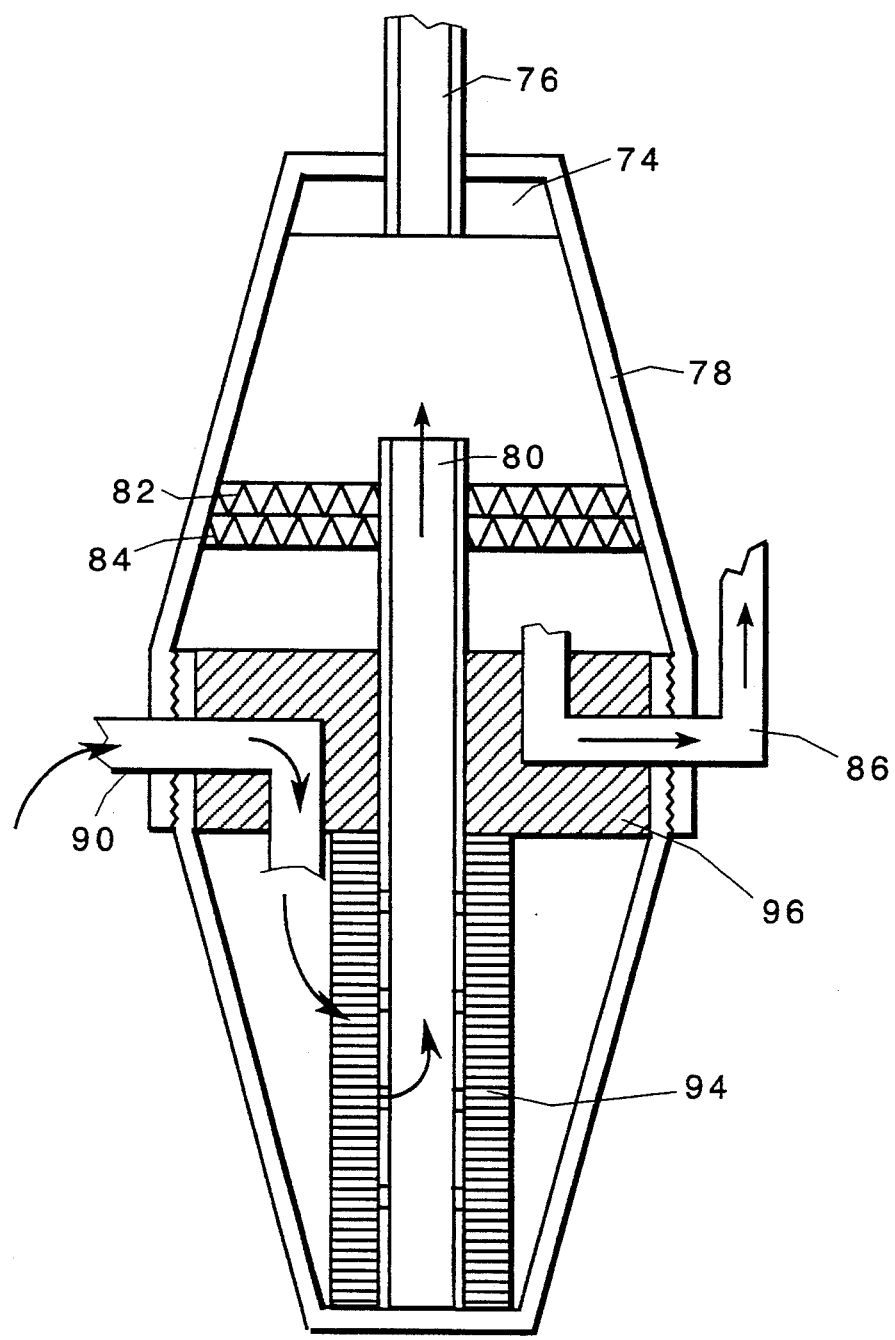
FIG. 2 is a cross sectional view of a separator for use with the coalescer.

FIG. 2 shows an oil-water separator for use with the stacked disk coalescer, to separate oil from water. An oil and water mixture is first passed through a disk-type coalescing element and water and coalesced slugs of oil enter the system under pressure through pipe 90, then through a short stacked coalescer 94, move up a central tube 80. The oil slugs rise toward the top 78 of the separator and water sinks towards the bottom of the separator. Plastic mesh separator pads 82 and 84 assist in removing trace oil from water. Nylon and polypropylene are two plastics from which pads can be manufactured. Water is drawn from an outlet pipe 86 and oil removed from the system through pipe 76. A plastic fill plate 74 keeps oil accessible, and barrier 96 keeps functions separate.

Figure 3:
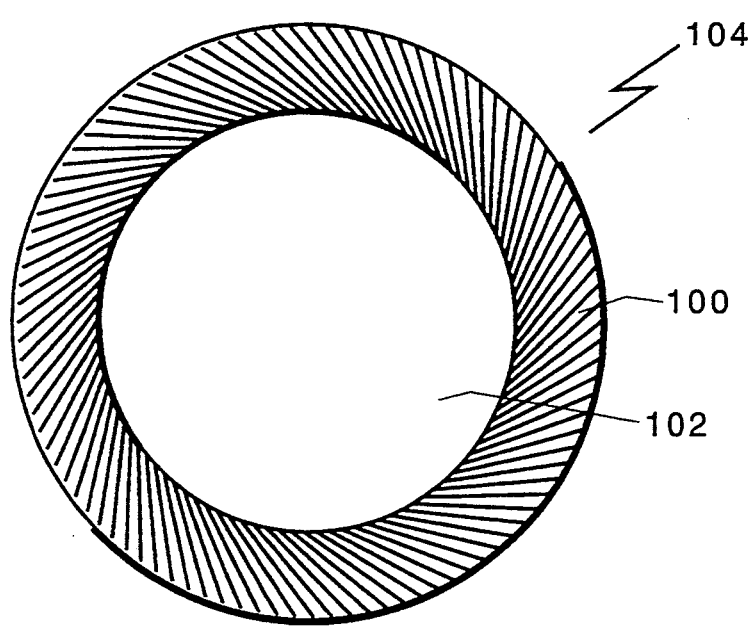
FIG. 3 is a top view of a disk used in the coalescing system.

FIG. 3 shows a disk 104 of the preferred configuration for a stacked disk coalescer 26. A central aperture 102 allows stacking on a perforated central column. Spirally arranged V-shaped grooves 100 located on top and bottom surfaces maintain a set spacing between plates in a stack, and form channels which to or from the central column through the inner chamber and exit to the outer area in the housing.

Figure 4:
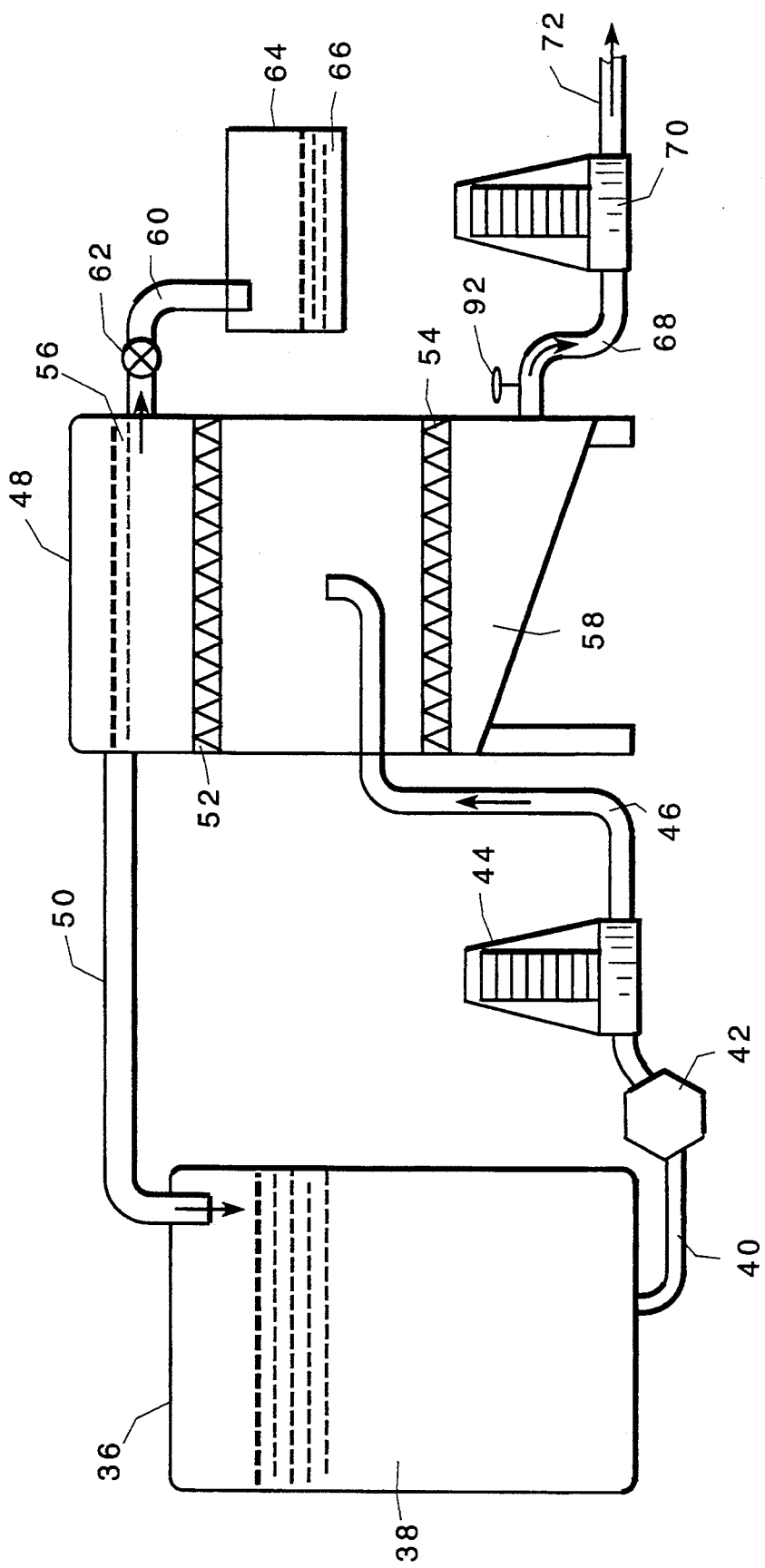
FIG. 4 is a schematic diagram of a second system for removing oil from an oil-water mixture.

FIG. 4 shows an alternative arrangement for separating oil and water. Waste water 38 in a feed tank 36 is forced by a pump 42 through a line 40 into a stacked disk coalescer 44. Water and oil slugs pass into a settling tank 48 through pipe 46. The tank has two mesh separator pads 52 and 54 for aid in separating oil and water. An overflow pipe 50 returns excess water to the feed tank 36. At the beginning of separation, Valves 62 and 92 are closed, and the settling tank 48 is full of relatively clean water. The oil-water mixture 38 is added to the feed tank 36 and the pump 42 started. The system is allowed to recycle via the overflow line 50 until it reaches equilibrium. Then oil 66 is taken off the top layer 56 through an upper outlet flowing through pipe 60 into a container 64. Water 58 is moved through a lower outlet pipe 68 and finished with a second stacked disk coalescer 70 before being removed through an exit pipe 72.

The above disclosure presents a method and materials for separation of oil from water, using disks originally designed for separation of particles from water to coalesce the oil. Because the oil does not need to be backflushed, possible that new disks may be developed. This method of coalescence allows configuration of systems which are compact, efficient, adaptable to modular configuration, and have a very high flow rate.

What is claimed is:

1. An oil-water separation system comprising:
   a first coalescer, said first coalescer comprising:
      a housing having an inlet for receiving an oil-water mixture and an outlet connectable to a conduit;
      a stack of grooved oleophilic disks located within said housing for coalescing oil from said oil-water mixture flowing between said disks from said inlet to said outlet wherein adjacent disks are touching; and
      a means for forcing said oil-water mixture to flow between said disks;

a first conduit having first and second ends, said first end being connected to said outlet; and
an oil separator, said separator comprising:
a housing having an inlet for receiving fluids, an upper outlet for removing separated oil, and a lower outlet for removing separated water, said separator inlet being connected to said second end of said first conduit;
a second conduit having first and second ends, said conduit being attached to said lower outlet at said second conduit first end; and
a second coalescing unit comprising:
a housing having an inlet for receiving fluid and an outlet, said second conduit second end being connected to said second coalescing unit inlet;
a stack of grooved oleophilic disks located within said housing for coalescing oil from said oil-water mixture flowing between said disks from said inlet to said outlet, wherein adjacent disks are touching and wherein said stacked disks define a mesh having a greater numerical value than a mesh defined by said first coalescer stacked disks and wherein said mesh defined by said second coalescing unit stacked disks is coarse enough to prevent coalesced oil from being forced downstream in reduced drop sizes; and a means for forcing said water to flow between said disks.

2. The separator of claim 1 wherein said first coalescer disks define flow passages from about 60 to 100 mesh and said second coalescing unit disks define flow passages from about 100 to 155 mesh.

3. An oil-water separation system comprising:
a first coalescer, said first coalescer comprising;
a housing having an inlet for receiving an oil-water mixture and an outlet;
a stack of grooved oleophilic disks located within said housing for coalescing oil from said oil-water mixture flowing between said disks from said inlet to said outlet; and
a means for forcing said oil-water mixture to flow between said disks;
a first conduit having first and second ends, said first end being connected to said first coalescer outlet;
an oil separator, said separator comprising:
a housing having an inlet for receiving fluids, an upper outlet for removing separated oil, and a lower outlet for removing separated water, said separator inlet being connected to said second end of said first conduit;
a second conduit having first and second ends, said second conduit being attached to said lower outlet at said second conduit first end;
a second coalescing unit comprising:
a housing having an inlet for receiving fluid and an outlet, said second conduit second end being connected to said second coalescing unit inlet;
a stack of grooved oleophilic disks located within aid housing for coalescing oil from said oil-water mixture flowing between said disks from said inlet to said outlet, wherein adjacent disks are touching and means for forcing said water to flow between said disks; and
a third conduit, said third conduit having first and second ends, said third conduit first end being connected to said second coalescing unit outlet; and
a carbon adsorpter, said adsorpter comprising;
a housing having an inlet for receiving fluid and an outlet, said third conduit second end being connected to said adsorpter inlet and adsorptive carbon located in said housing.

4. The system of claim 3 further comprising: a pump for providing pressure to said mixture.

5. The system of claim 3 wherein at least one of said housings is transparent.

6. An oil-water separation system comprising:
a coalescer, said coalescer comprising:
a housing having first and second chambers and an inlet for receiving oil-water mixture in said first chamber and an outlet in said second chamber;
a passageway from said first chamber to said second chamber having an opening in said second chamber substantially above said outlet;
a stack of grooved oleophilic disks located within said housing first chamber for coalescing oil from said mixture flowing between said disks to said passageway to said second chamber;
a means for forcing said mixture to flow between said disks; and
a plastic mesh located in said second chamber between said passageway opening and said outlet.

7. The separator of claim 6 wherein said disks define flow passages from about 40 mesh (400 micron) to about 155 mesh (100 micron).

* * * * *